(12) United States Patent
Querejeta

(10) Patent No.: US 7,600,529 B2
(45) Date of Patent: Oct. 13, 2009

(54) DUAL GAS PRESSURE REGULATOR FOR A HOUSEHOLD APPLIANCE

(75) Inventor: Felix Querejeta, Vitoria (ES)

(73) Assignee: Coprecitec, S.L., Aretxabaleta (ES)

( * ) Notice: Subject to any disclaimer, the term of this patent is extended or adjusted under 35 U.S.C. 154(b) by 377 days.

(21) Appl. No.: 11/601,152

(22) Filed: Nov. 17, 2006

(65) Prior Publication Data

US 2007/0151606 A1    Jul. 5, 2007

(30) Foreign Application Priority Data

Dec. 2, 2005    (ES) ............................. 200502655 U

(51) Int. Cl.
G05D 16/06    (2006.01)
(52) U.S. Cl. .............................. 137/505.14; 137/505.41
(58) Field of Classification Search ................ 137/495, 137/505.14, 505.41
See application file for complete search history.

(56) References Cited

U.S. PATENT DOCUMENTS

| | | | | |
|---|---|---|---|---|
| 1,286,397 A | * | 12/1918 | Olsen | ........................ 137/495 |
| 3,747,629 A | * | 7/1973 | Bauman | ................. 137/505.41 |
| 4,637,429 A | * | 1/1987 | Dietiker et al. | .......... 137/505.14 |
| 5,988,204 A | | 11/1999 | Reinhardt et al. | |

\* cited by examiner

*Primary Examiner*—Stephen Hepperle
(74) *Attorney, Agent, or Firm*—Tim L. Kitchen; Peter B. Scull; Berenbaum Weinshienk PC

(57) ABSTRACT

Gas pressure regulator valve adapted to a household appliance for the supply of a flow of NG or LPG gas that comprises a valve body (11) with an inlet conduit (12), an outlet conduit (13) of the gas at a nominal pressure, a pressurised chamber (14) connecting both conduits through a regulation valve (39,40), a diaphragm (22) connected to the valve member (39), a closure cap (26) and means (26-29,19,23,35) for the adjusting of the nominal pressure for NG or LPG gas. The adjusting means include a prestressed adjusting screw (35) on the diaphragm (22), a guide means (28) of the rotation on the cap (26) and a stopper means of the rotation on the body (11). The pressure value is adjusted by the rotation of the cap between two positions.

3 Claims, 3 Drawing Sheets

DUAL GAS PRESSURE REGULATOR FOR A HOUSEHOLD APPLIANCE

The present invention relates to a diaphragm type gas pressure regulator valve adapted to a gas supply valve for a household appliance with interchangeable means according to the type of gas supplied, natural gas NG or liquefied petroleum gas LPG.

PRIOR ART

A pressure regulator of this type is used to adjust the gas pressure in a supply valve, regulating respectively either of two different pressure values for a household appliance which is supplied with natural gas (NG) or with liquefied petroleum gas (LPG). In order to adjust one or other pressure value, the pressure regulator is disposed with an interchangeable adjusting means which is fitted when the supply valve is installed in the household appliance.

Patent document U.S. Pat. No. 5,988,204 discloses an adjustable gas pressure regulator that can selectively adjust the input gas flow to one or other pressure value adapted to the different gas types, and comprises a valve body with a pressurised gas chamber, an inlet gas conduit and an outlet gas conduit both connected by said pressurised chamber, through a regulator valve activated by a diaphragm in response to pressure changes in the inlet gas conduit, a closure cap above the diaphragm screwed to the body, a first adjusting spring exerting a biasing force against the diaphragm for the adjusting of the output pressure and prestressed beneath the closure cap and a hollow screw threaded on said cap and aligned with the first pressure adjusting spring. The adjusting screw is detachable and includes an air ventilation hole that keeps an air chamber at the atmospheric pressure, being situated above said diaphragm and defined by the closure cap. When a specific pressure is required for the LPG gas in the outlet gas conduit, the adjusting screw on the cap is detached, and a disc with a second adjusting spring is assembled in its inner cavity, coaxial to the first spring, exerting an additional pressure against the diaphragm for the adjusting of a nominal value of the pressure of the NG gas in the valve. This regulation valve has the drawback of requiring different diaphragm adjusting means for a LPG gas or a NG gas, so that an adjusting piece must be interchanged for one or another type of gas. It also needs more than one adjusting spring depending on the type of gas.

DISCLOSURE OF THE INVENTION

The object of this invention is to provide a valve regulator pressure for the supply of a LPG or a NG gas flow at a nominal pressure to a household appliance, provided with a system for adjusting the nominal pressure actionable between two positions for the supply of either of both types of gas.

The gas pressure regulator valve according to the invention is provided with means for the adjusting of the nominal pressure for the two types of NG and LPG gas, by acting on the closure cap of the body and an adjusting screw, without the need to interchange any piece for the adaptation to one or other type of gas. The pressure regulator valve has the advantage of using equal adjusting means for one and another type of gas, the pressure value being adjusted by the rotation of the closure cap between two positions. The closure cap is assembled in a rotating manner in order to take up two positions respectively for the adjusting of NG or LPG, as a result of which the assembly means are adapted to the diaphragm and to the valve body. A retainer ring limits the displacement of the closure cap in an axial direction but bestows it with a degree of freedom of rotation, necessary to exchange its relative position to the diaphragm depending on the type of supplied gas. The same adjusting screw and the same pressure value adjusting spring remain assembled on the regulator valve even if the type of gas supplied changes.

DETAILED DISCLOSURE OF THE INVENTION

Figure 2:
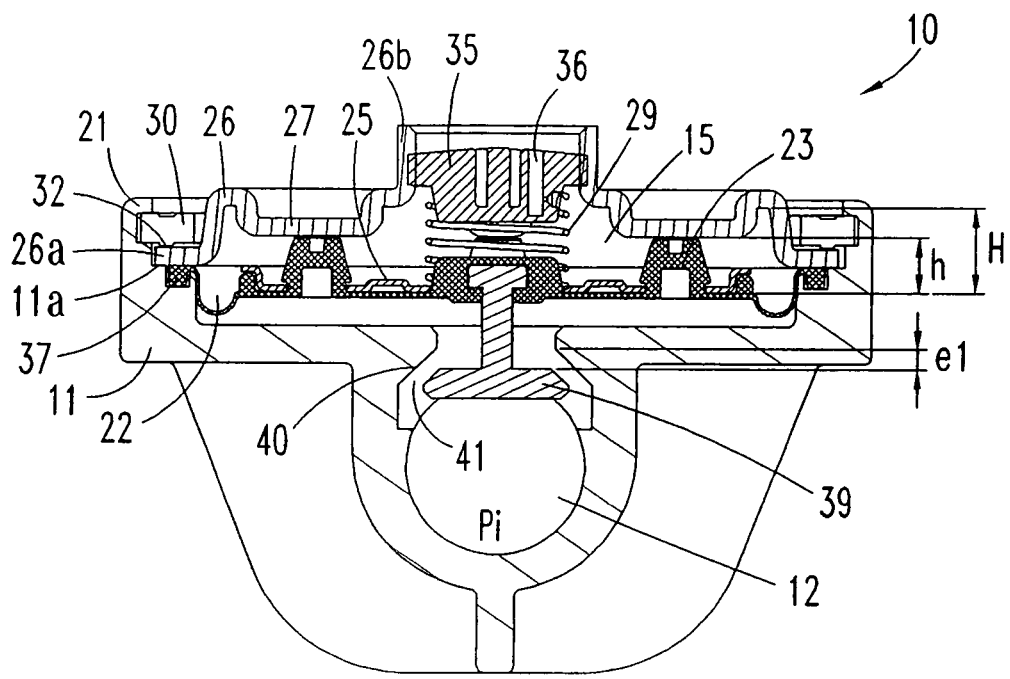
FIG. 2 is a sectional view of the gas pressure regulator valve according to the II-II line of FIG. 1, showing the passage of LPG gas regulated by the adjusting means for the LPG gas regulation.

In reference to FIGS. 1-6, a preferred embodiment of a gas pressure regulator valve 10 is adapted for its connection to an NG or LPG gas flow distribution valve or directly to a household appliance, and comprises a valve body 11 with a inlet gas conduit 12 connected to a NG or LPG gas source and a outlet gas conduit 13 regulated at a respective nominal pressure Pn or Pi of the type of gas supplied, which is connected to a pressurised gas chamber 14 through a regulation valve 39,40 activated by a division diaphragm 22, to which is fixed the valve member 39. The diaphragm 22 separates the pressurised gas chamber 14 from an air chamber 15 at atmospheric pressure closed by a closure cap 26 of the valve body 11, and is fixed onto a peripheral surface 11a on the body 11.

The closure cap 26 is provided with a peripheral rim 26a for its assembly on the surface 11a of the valve body 11 through an O-ring seal 37. The closure cap 26 has a degree of freedom "A" for the rotation relative to the fixed diaphragm 22, which enables the regulator valve 10 of a nominal pressure Pn or Pl of an NG or LPG gas supply fed into the inlet gas conduit 12 to be changed manually. Several fixing ribs 24 in the periphery of the diaphragm 22 are housed in grooves 18 on the peripheral surface 11a of the valve body 11, thus blocking the rotation of the fixed diaphragm 22, shown in FIG. 5.

An adjusting screw 35 threaded on the closure cap 26 enables the adjusting of the nominal pressure Pl (FIG. 2) or Pn (FIG. 4) required in the gas chamber 14 connected to the outlet conduit 13. As an example of the nominal pressure Pn value regulated for an NG gas flow, Pn is equal to 3½"-4½" of $H_2O$, the pressure of the NG gas in the inlet conduit 12 of Pi being equal to 2½"-6" of $H_2O$. The nominal pressure Pl of LPG gas is not regulated because the LPG source itself keeps constant the pressure Pi=Pl in the inlet gas conduit 12. A spring 29 compressed beneath the adjusting screw 35 threaded on the closure cap 26 is disposed as adjusting means. The spring 29 pushes against the division diaphragm 22 in order to displace the valve member 39 and to maintain said preset nominal pressure Pn or Pl with the variations in the gas pressure Pi.

The pressurised gas chamber 14 is defined in an inner cavity of the body 11 between the division diaphragm 22 and the regulation valve 39,40. The air chamber 15 defined between the closure cap 26 and the diaphragm 22 communicates with the atmospheric pressure through a ventilation hole 36 drilled in the adjusting screw 35. This screw is threaded into a neck 26b of the closure cap 26, inside which it can be displaced in order to compress the regulator spring 29 and to displace the valve member 39 to a specific measurement for the adjusting of the nominal pressure Pn or Pl.

The distance of separation "e1" (FIG. 2) and "e2" (FIG.4) between the retainer valve 39 and its seating 40 determines the area of passage of the valve hole 41 adjusted for the regulation of the respective output pressure Pl or Pn from the pressure regulator valve 10. Said initial openings "e1" and "e2" of the valve member 39 are prefixed by the rotation of the closure cap 26 to two respective angular positions 34 and 33. This regulation of the nominal pressure Pl or Pn is normally performed once in the apparatus life, when the pressure adjusting valve 10 is installed initially in the apparatus. The adjusting screw 35 compresses the regulator screw 29 in the neck of the closure cap 26b, in greater or smaller length, adjusted to oppose a specific resistance to the push of the pressure Pi on the valve member 39 and thus effect the regulation of the pressure. In the case of LPG gas (FIG. 2) the valve member 39 remains stationary because the pressure Pl is constant.

The force exerted against the division diaphragm 22 by the spring 29, contrary to the pressure Pi exerted by the incoming gas in the gas chamber 14, regulates the displacement "e" of the valve member 39 in a stroke around a previous respective adjusting displacement "e1" or "e2".

A rigid disc 25 is fixed to the division diaphragm 22 concentric with it, so that it acts as a support base for the spring 29, providing at the same time, the support to the diaphragm 22 itself. A retainer ring 30 for the closure cap 26 and the division diaphragm 22 is assembled on the peripheral rim 26a of the closure cap 26. The retainer ring 30 is secured to the valve body 11 through a fixing means 21 that includes a thin peripheral edge of the body 11 that is riveted against the retainer ring 30. The thin peripheral edge of the body 11 may be replaced by screws that secure the retainer ring 30 to the valve body 11.

The retainer ring 30 includes various inserts 32 that are supported on the closure cap 26 preventing friction between both pieces when the closure cap 26 is rotated. The axial movement of the closure cap 26 is thus restricted, and at the same time, its rotation of angle "A" between two positions 33 and 34 (FIG. 5), necessary for effecting the adjustment of the nominal pressure Pn for natural gas NG or Pl for LPG respectively, is permitted.

Figure 1:
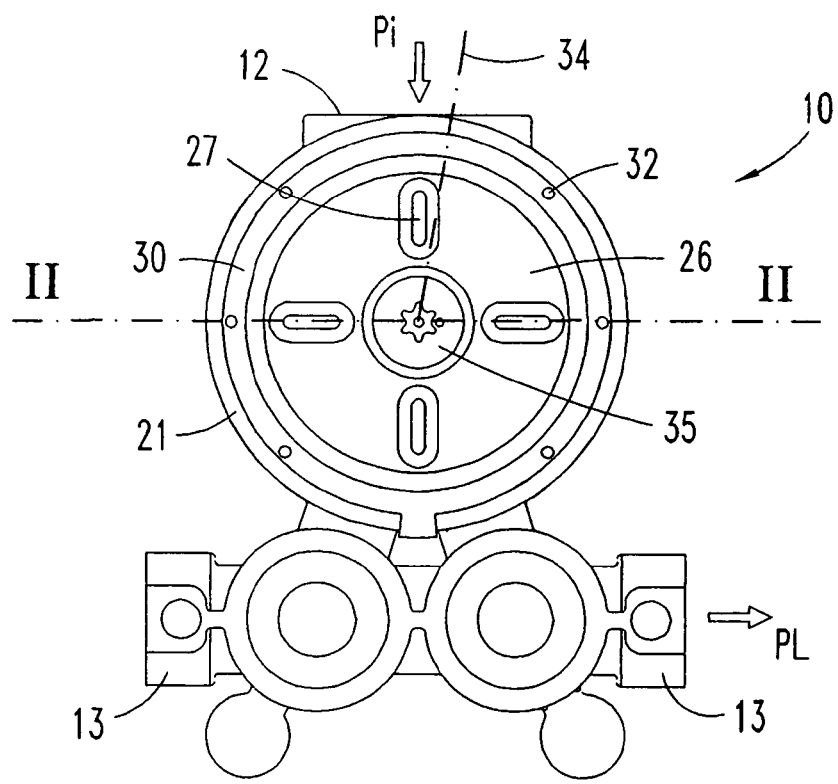
FIG. 1 is a ground view of a gas pressure regulator valve according to the invention, shown with a pressure adjusting means for the regulation of a flow of liquefied petroleum gas LPG.

In reference to FIGS. 1-2, a gas pressure regulator valve 10 is shown, adjusted for its use with LPG. The air chamber 15 takes up a height "H" between the closure cap 26 and the base of the diaphragm 22. The peripheral rim 26a of the closure cap 26 provides said space of height "H" on the base of the diaphragm 22. The closure cap 26 is provided with various inserts 27 oriented towards the diaphragm 22, and the latter is provided with various protuberances or nipples 23 oriented towards the closure cap 26. The inserts 27 in the closure cap 26 are spaced between them in the radial direction and maintain a relative position inside the circular area of the closure cap 26. The protuberances 23 on the diaphragm 22 maintain an equal relative position in the radial direction to the inserts 27 in the cap 26. The height "h" (FIG. 2) between an insert 27 projecting out of the closure cap 26 and the base of the division diaphragm 22 is of such a dimension that it interferes with the opposite projecting height of a protuberance or nipple 23 on the diaphragm 22, as a result of which once the rotation "A" of the cap 26 for the use of the pressure regulator 10 with liquefied petroleum gas LPG has been effected towards the angular position 34, the inserts 27 are in a position where the protuberances 23 are on top of them, the diaphragm 22 and the valve member 39 thus being displaced for the adjusting opening "e1" of the regulation valve 39,40 shown in FIG. 2.

Figure 4:
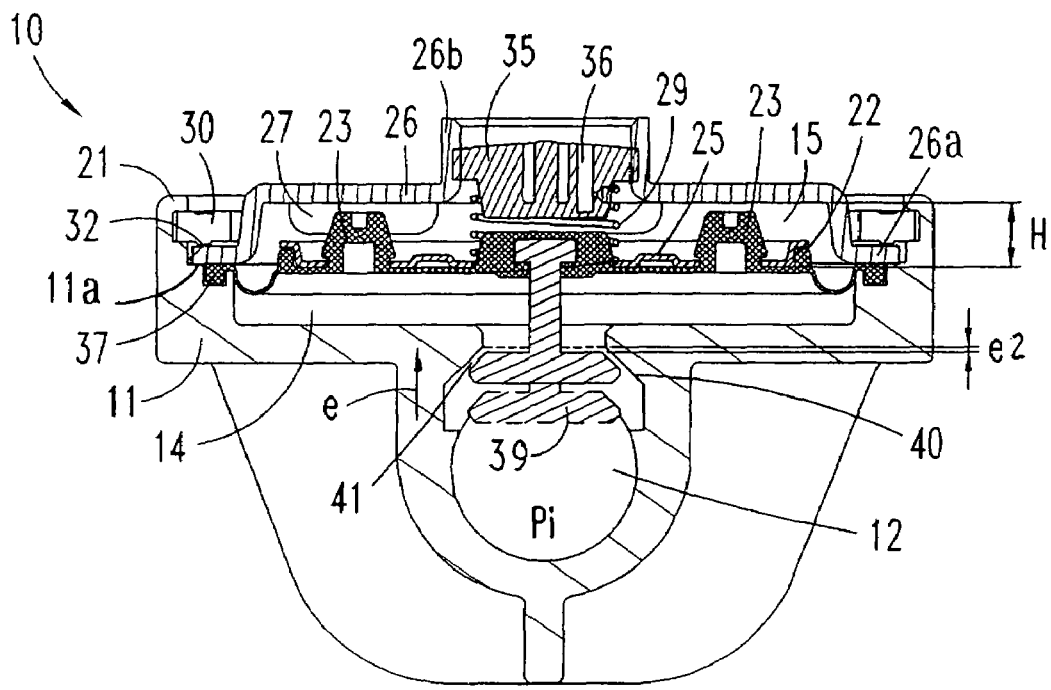
FIG. 4 is a sectional view of the gas pressure regulator valve according to the IV-IV line of FIG. 1, showing the passage of gas regulated by the adjusting means for the regulation of a natural gas NG flow.
Figure 3:
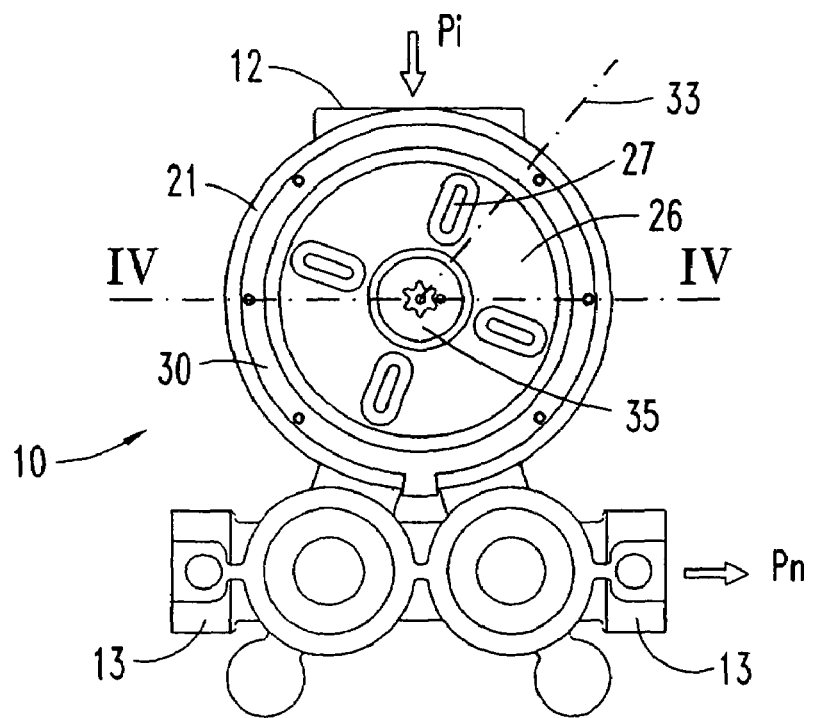
FIG. 3 is a ground view of the gas pressure regulator valve of FIG. 1, shown with the adjusting means in the adjusting position for the regulation of a natural gas NG flow.

In reference to FIGS. 3-4, the gas regulator valve 10 is now shown adjusted for its use with natural gas NG. In this case, the closure cap 26 is oriented towards the angular position 33. Due to the fact that the height "H" of the air chamber 15 between the cap 26 and the division diaphragm 22, is greater than the height "h" of the protuberances 23 of the diaphragm 22, in said position 33 the inserts 27 projecting from the closure cap 26 do not collide with the protuberances 23 of the diaphragm 22, as a result of which the diaphragm 22 has a degree of freedom for the axial displacement, driven by the pressure Pn of the NG gas. The valve member 39 maintains said initial prefixed opening "e2" (FIG. 4) by the adjusting of the screw 35 and the spring 29. In the regulation regime, the pressure Pi in the inlet conduit 12 of gas tends to displace the diaphragm 22 and with it the valve member 39, in the direction of closure of the hole 41 of the regulation valve. At the same time, the spring 29 exerts a force on the division diaphragm 22 in a direction opposite to said pressure Pi, tending to open the valve hole 41 inside a stroke "e2" of the valve member 39 for the purpose of maintaining a constant pressure Pn in the outlet gas conduit 13.

Figure 5:
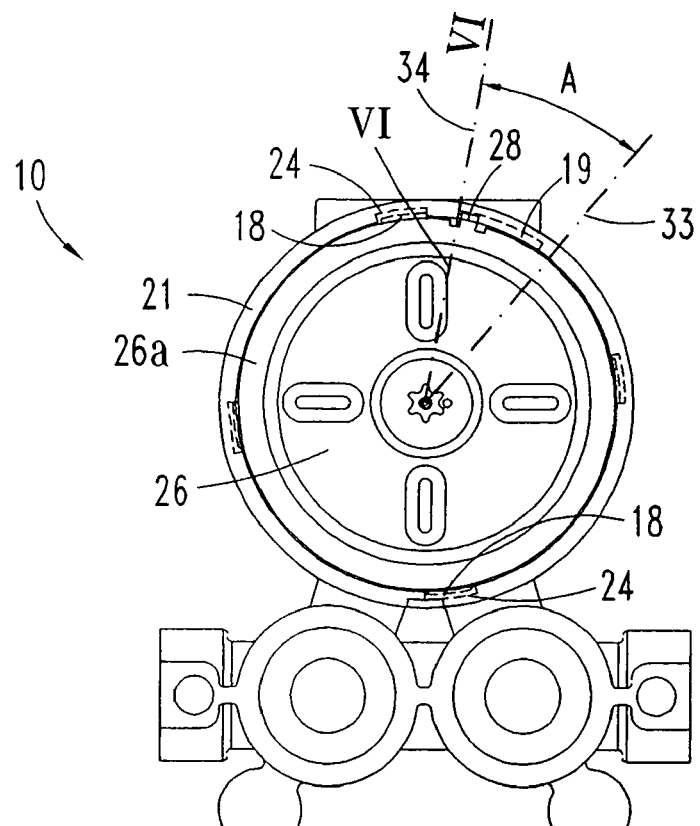
FIG. 5 is a ground view of the gas pressure regulator valve of FIG. 1, showing an internal detail of the closure cap of the valve.
Figure 6:
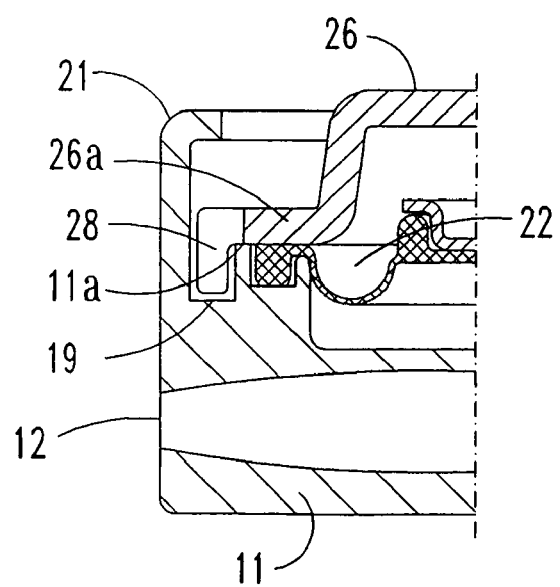
FIG. 6 is a partial sectional view of the gas pressure regulator valve according to the VI-VI line of FIG. 5.

In reference to FIGS. 5-6, where the gas pressure regulator valve 10 is shown without the retainer ring 30, the closure cap 26 includes a guide means 28 of the rotation, such as a protrusion situated on its periphery as a flange bent towards the valve body 11, being inserted in a slide groove 19 on the peripheral surface 11a of the body valve 11. The slide groove 19 extends an arc of "A", for example 25°, and limits the rotation of the closure cap 26 to the angle "A" between the two angular positions 33,34 (FIG. 5). In the angular position 34 (FIG. 2) corresponding to the adjusting of the regulator 10 for LPG-type gas, the protrusion 28 abuts against one of the ends of the slide groove 19, whereas the protuberances 23 of the diaphragm 22 are biased by the inserts 27 of the closure cap 26. On the other hand, in the angular position 33 (FIG. 4) corresponding to the use of the regulator 10 with NG-type gas, the protrusion 28 abuts against the opposite end of the slide groove 19, whereas the inserts 27 of the closure cap 26 do not interfere with the protuberances 23 of the diaphragm 22, and as a result of this, the valve member 39 remains adjusted in the small opening "e2" prefixed by the adjusting screw 35.

In order to carry out this operation of rotating the closure cap 26 to one of the two positions, 33 for NG and 34 for LPG, the user requires a tool fitted into the inserts 27 of the closure cap 26 by means of a small torque such as 100 Ncm. The use of an adjusting tool prevents incorrect or unintentional manipulation of the closure cap 26.

They can be incorporated other embodiments of the closure cap 26 with a guide means for the different rotations of a peripheral protrusion 28, as well as a different stopper means for the closure cap 26 rotation from the slide groove 19 on the surface 11a of the valve body 11. The retainer ring 30, forming a fixed part with the valve body 11, can incorporate, this way, said stopper means for two angular positions 33,34 of the cap 26 separated at an arc of 25° or similar.

What is claimed is:

1. A gas pressure regulator valve adapted to a household appliance for the supply of a gas flow of any type of gas, natural NG or liquified LPG, comprising:
   a valve body with an inlet gas conduit from a NG or a LPG source at a variable pressure Pi, an outlet gas conduit of NG or LPG gas supplied at a respective nominal adjusted pressure Pn or Pl of said two types of gas, and a peripheral assembly surface;
   a pressurised gas chamber connecting both the inlet and outlet conduit through a regulation valve whose passage hole is adjustable,
   a division diaphragm connected to the valve member and assembled securely on the valve body, through a flexible seal;
   a rotatable closure cap assembled on the valve body and defining an air chamber above the diaphragm at the atmospheric pressure;
   adjusting means of said nominal pressure value Pn or Pl of the gas acting on the diaphragm and the valve member to effect on the latter a prefixed adjusting displacement,
   said adjusting means comprising an adjusting screw threaded in the closure cap, at least one adjusting spring, prestressed and acting on the diaphragm to keep said pressure Pn or Pl in the gas chamber constant, a rotation guide in the closure cap and a rotation stopper in the valve body engageable with the rotation guide, and the closure cap provided with a retainer that retains the closure cap on the valve body, in the axial direction of the closure cap and of the valve body, permitting a degree of freedom for the rotation of the closure cap in relation to the valve body between two angular positions, an arc (A) being spaced between them, and
   wherein said adjusting means on the closure cap determines in conjunction with a feature on the diaphragm two displacements of the valve member different to each other, for the adjusting of said respective nominal pressures Pn and Pl.

2. The gas pressure regulating valve according to claim 1, wherein said closure cap comprises a spacer that provides, in said air chamber, a space of separation of the closure cap on a base of the diaphragm and a peripheral rim that is positioned on said peripheral assembly surface on the valve body, for its sliding in rotation on said flexible seal, and a rigid retention ring of the closure cap secured to said valve body in such a way that the closure cap is conferred with said degree of freedom for the rotation (A).

3. The gas pressure regulating valve according to claim 1, wherein said said feature on the diaphragm comprises at least a pair of protuberances on the diaphragm oriented towards said air chamber and said adjusting means comprises at least two inserts on the closure cap projecting towards the diaphragm from a relative position in the specific radial direction which, in one of said angular positions of the closure cap act on the diaphragm protuberances, displacing the valve member to a prefixed adjusting opening of the regulation valve.

* * * * *